United States Patent

[11] 3,590,250

| [72] | Inventor | Richard L. Witkover |
| --- | --- | --- |
| | | Commack, N.Y. |
| [21] | Appl. No. | 830,970 |
| [22] | Filed | June 6, 1969 |
| [45] | Patented | June 29, 1971 |
| [73] | Assignee | The United States of America as represented by the United States Atomic Energy Commission |

[54] VALVE AND PULSE-WIDTH-MODULATED DATA LINK USING INFRARED LIGHT TO CONTROL AND MONITOR POWER SUPPLY FOR MODULATOR FOR HIGH-ENERGY LINEAR ACCELERATOR
9 Claims, 4 Drawing Figs.

[52] U.S. Cl.................................................. 250/199, 328/233, 328/235
[51] Int. Cl........................................... H04b 9/00
[50] Field of Search............................................ 250/45, 199, 229; 328/233, 235

[56] References Cited
UNITED STATES PATENTS

| 3,343,096 | 9/1967 | Rheavme............ | 328/235 |
| --- | --- | --- | --- |
| 3,497,616 | 2/1970 | McCown............. | 250/199 |

Primary Examiner—Robert L. Griffin
Assistant Examiner—Albert J. Mayer
Attorney—Roland A. Anderson ABSTRACT: Method and apparatus for transmitting information across a high-voltage interface by light pulse-width modulation for remotely monitoring, controlling and/or energizing high-voltage apparatus.

INVENTOR.
RICHARD L. WITKOVER
BY
Richard P. Anderson

INVENTOR.
RICHARD L. WITKOVER 3,590,250

1

VALVE AND PULSE-WIDTH-MODULATED DATA LINK USING INFRARED LIGHT TO CONTROL AND MONITOR POWER SUPPLY FOR MODULATOR FOR HIGH-ENERGY LINEAR ACCELERATOR

BACKGROUND OF THE INVENTION

1. Field of the Invention

This invention relates to apparatus and method for transmitting high frequency information across a high-voltage interface, and more particularly to compact, efficient, and accurate apparatus and method for monitoring and/or transmitting high frequency control information across a high-voltage gradient interface for controlling and/or energizing high-energy accelerators for the fast accurate pulsing thereof.

2. Description of Prior Art

In the field of high-energy accelerators, a need exists for means for selectively monitoring and/or transmitting information, such as command signals, across a high-voltage interface for the control and energization of high-energy accelerators. These linkage means must transmit information and command signals from DC to high frequencies in the kilohertz range across an airgap of up to several feet forming voltage potential gradients of from 60 kv. up to 750 kv. or more. Additionally, it has been advantageous to provide a practical, compact, accurate and economic means for transmitting information across a high-voltage potential gradient and for controlling high-voltage apparatus in a high radiofrequency radiation environment. Heretofore, however, insulated mechanical devices for such potentials have not operated properly at such frequencies. Others, such as those that have depended on pulsed gas discharge tubes, have either operated over too small a frequency range or have been too complicated, inaccurate, cumbersome or expensive for routine use.

SUMMARY OF THE INVENTION

This invention was made in the course of, or under a contract with the United States Atomic Energy Commission.

In accordance with this invention, a low-voltage, compact, accurate, practical and economic apparatus and method are provided for rapidly transmitting information across a high-voltage interface for controlling a high-energy accelerator by utilizing light pulses whose pulse width is modulated to transmit the desired information. More particularly, in one embodiment, this invention comprises an infrared, pulse-width-modulated, light source means, for transmitting information and for controlling a charge control tube for charging and recharging a capacitor bank for controlling and energizing a linear accelerator. It is also advantageous to provide practical, compact, accurate and economic means for transmitting information and controlling high-voltage apparatus in a high radiofrequency radiation environment for linking the high-voltage apparatus with low-voltage linkage means in both directions for controlling and monitoring the high-voltage apparatus.

The above and further objects and novel features of this invention will appear more fully from the following when the same is read in connection with the accompanying drawings. It is expressly understood, however, that the drawings are not intended as a definition of the invention but are for the purpose of illustration only.

BRIEF DESCRIPTION OF THE DRAWINGS

In the drawings where like elements are referenced alike.

DETAILED DESCRIPTION OF A PREFERRED EMBODIMENT

The data link means of this invention is useful in transmitting information and control signals across a high-voltage interface for controlling and monitoring a precision-regulated power supply for a modulator for the high-energy linear accelerator at the Brookhaven National Laboratory as described hereinafter in connection with FIGS. 1 and 2, and referred to hereinafter for convenience as a linac. To this end the pulse-width-modulated data link of this invention transmits information and control signals across a high-voltage interface for controlling the grid of a charge control tube in the high-voltage floating deck in the precision-regulated power supply for the accelerator RF source. However, this invention is useful in any application where it is desired to transmit information and command signals across a high-voltage interface for monitoring or controlling apparatus at high-voltage potentials.

Figure 1:
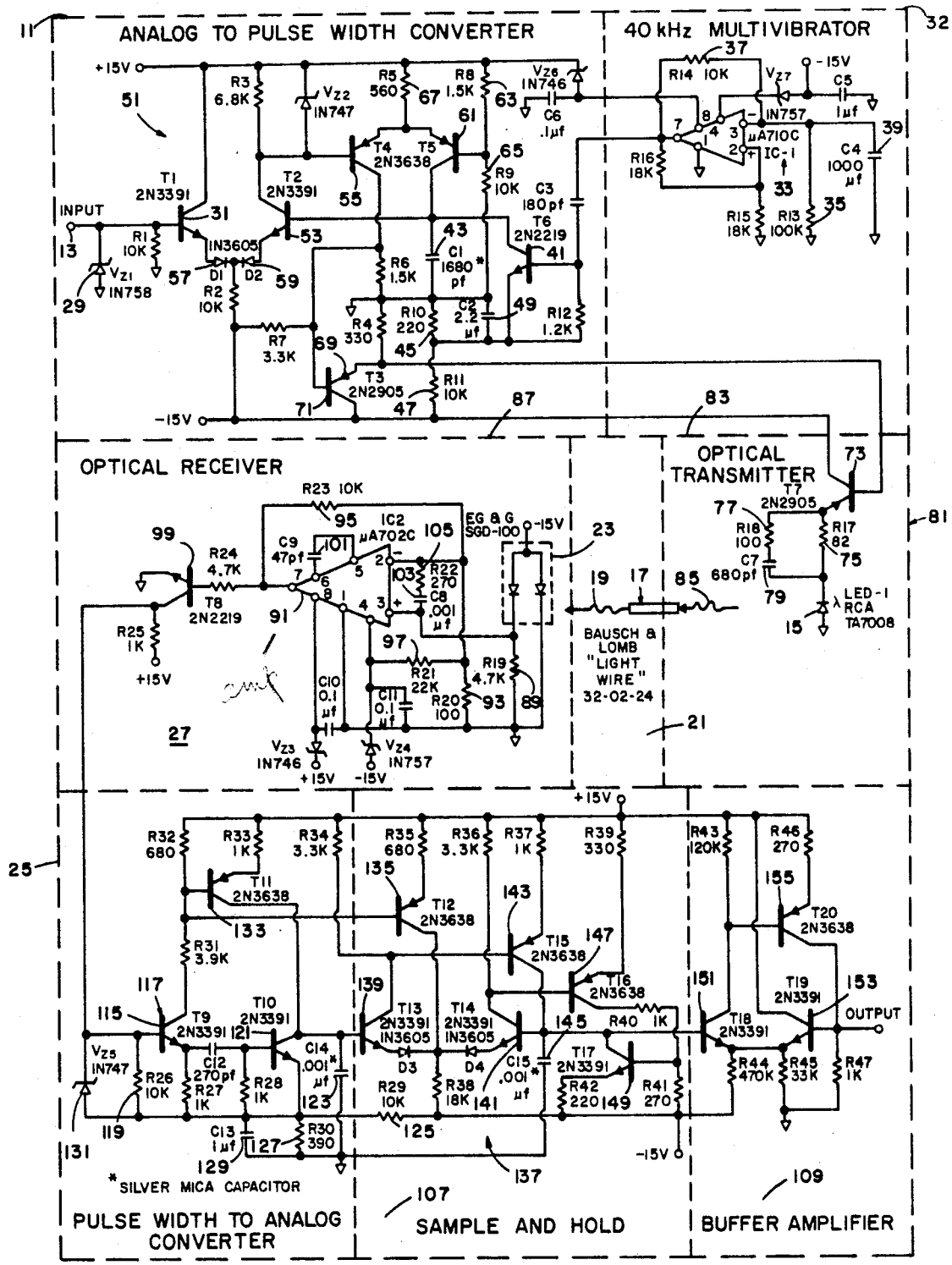
FIG. 1 is a partial schematic wiring diagram of the light pulse width information transmission and high-voltage control means of this invention.
Figure 2:
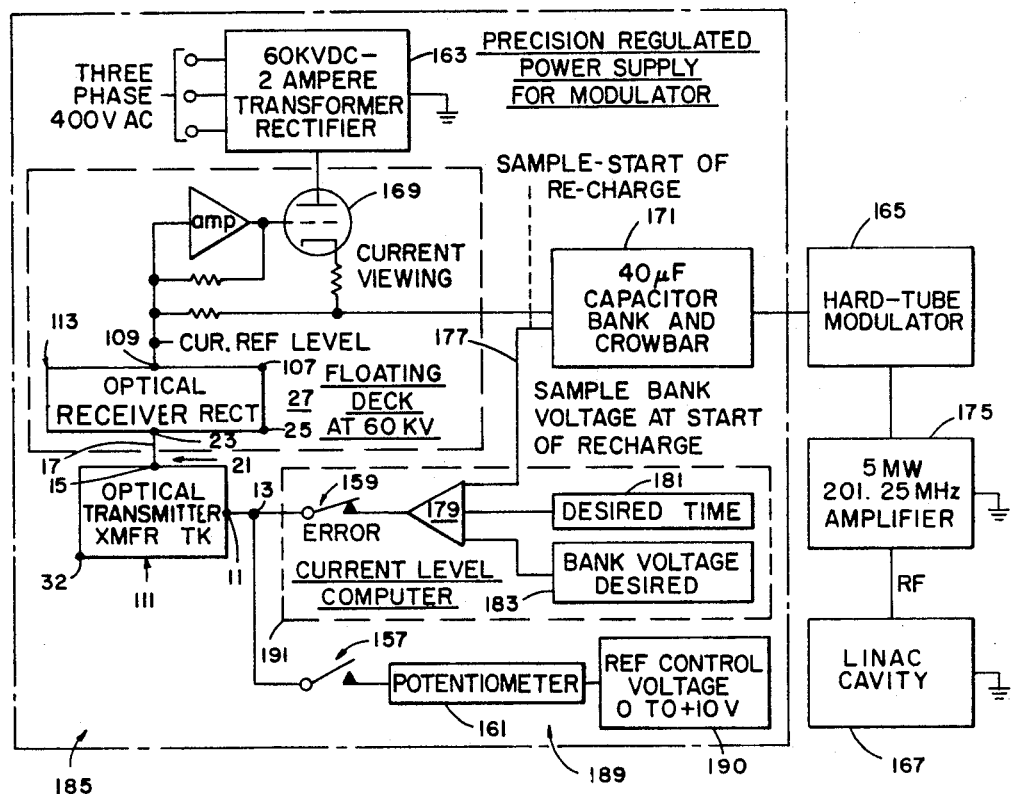
FIG. 2 is a partial schematic view of a practical embodiment of the apparatus of FIG. 1 for controlling a high-energy linear accelerator.

Referring to FIG. 1, an analog-to-pulse-width converter 11 converts a suitable analog input modulation signal, as described in more detail hereinafter, into a pulse whose pulse width corresponds to the amplitude of the analog input applied to input terminal 13. This pulse-width-modulated signal then actuates an ir (9,100A.) light-emitting diode 15, which produces a light pulse whose pulse width corresponds to the pulse width of the input signal thereto. Light pipe 17, which comprises a plurality of quartz fibers 19 (one of which is shown for ease of explanation), transmits the pulse-width-modulated light pulse across high-voltage potential gradient gap 21. This pulse-modulated light pulse then falls on a silicon P-N photodiode detector 23, which is followed by a pulse-width-to-amplitude converter 25 in a high-voltage floating deck 27 to produce an output signal whose amplitude corresponds to the amplitude of the analog input at input terminal 13.

As will be understood from the following, the pulse-width modulation of this invention, requires only a single optical channel to transmit the desired information, whereas a digital code in the form of an analog-to-digital converter requires as many channels as bits for parallel outputs, and/or a separate clock channel in the serial output case. Moreover, the pulse-width modulation of the light-emitting diode 15 of this invention, as described in more detail hereinafter, has the advantage that the input signals to the diode 15 may vary over a wide range of input amplitude levels, up to the level of saturation of the diode 15. This permits the use of high-amplitude input modulation signals and light output levels, well beyond the linear range of the diode outputs and a wide diode amplitude operating range substantially independent of the characteristics of the emitting and receiving diodes 15 and 23. Also, problems of aging of the diodes and light pipe components, comprising ionizing radiation damage and/or optical deterioration, and unit-to-unit variations are of relatively minor importance or are eliminated. Also, ionizing radiation damage is easily reduced or controlled by suitable shielding due to the compact size.

Referring now more particularly to the embodiment shown in FIG. 1, Zener diode 29, limits to +10 v. the analog input modulation signal applied through terminal 13 to the base of transistor 31 in analog-to-pulse-width converter 11. The input signal through input terminal 13 starts when a 38.3 kHz. multivibrator 32 formed by interstage coupling 33, resistors 35 and 37 and capacitor 39, drives transistor 41 to saturation, dumping any initial charge on runup capacitor 43. Resistors 45 and 47, which are bypassed by capacitor 49, cancel zero offset, while the resetting of capacitor 43 to zero unbalances the comparator 51 formed by transistors 31 and 53, causing transistor 55 to be cut off. Diodes 57 and 59 prevent breakdown of the base-to-emitter junctions when the analog voltage at input terminal 13 exceeds 6v. With transistor 55 cut off, transistor 61 operates to conduct as a constant current source, as set by resistors 63, 65 and 67. Capacitor 43 then charges at constant current resulting in a linear increase in voltage with time. When the voltage of capacitor 43 equals the analog input at input terminal 13, the comparator 51 balances, transistor 55 again conducts and transistor 61 cuts off. Thus, transistor 55 cuts off for the time taken by the voltage of capacitor 43 to reach the input analog level at input terminal 13. By means of a suitable bias, such as −15 v. applied to its collector 69, transistor 71 conducts whenever transistor 55 cuts off, providing a negative output pulse whose duration is proportional to the input amplitude at input terminal 13, with a 10 μsec. pulse width corresponding to a 10 v. input at input terminal 13. An emitter follower 73 forward biases the light-emitting diode 15 through resistors 75 and 77 and capacitor 79, which set the drive current level and provide high frequency compensation for the diode junction capacitance. The circuit illustrated in FIG. 1 employs a 30 mA. drive current during the input pulse to diode 15. The diode 15 advantageously has a 100 mA. average rating to allow considerable design margin, and to permit high-amplitude pulse-width-modulated light pulse output signal levels in the presence of environmental noise.

In the practical embodiment illustrated in FIG. 1 the pulse width variation of the pulse-width-modulated light pulse emitted by diode 15 is from 1 μsec. for 0 v. input, at input terminal 13, wherein the light pulse-width modulation corresponds to the amplitude variation of the signal received at input terminal 13. The lower limit chosen provides reasonable resolution for short input pulses to both the input terminal 13, and light-emitting diode 15. Moreover, an input pulse rise time of 80 nanosec. to emitting diode 15, gives a clearly defined 1 μsec. pulse-width-modulated light output pulse from light-emitting diode 15. The upper limit chosen compromises between resolution and sample rate.

Advantageously, an aluminum radiation shield 81 houses the circuit of the embodiment of FIG. 1 with power leads brought through miniature RFI filters, whereby the circuit can be located near a 5MW pulsed RF amplifier, described in more detail hereinafter. Likewise, the light-emitting diode 15 has a radiation shield 83, comprising a brass housing held in place by polytetrafluoroethylene insert that aligns the end cap 85 of the quartz fiber containing light pipe 17.

After passage through light pipe 17, two diodes 23 (which may actually be, however, a guard ring and a single diode, rather than the two diodes that are schematically represented) receive the pulse-width-modulated light pulse emitted from diode 15. To this end the detecting diode structure 23, advantageously comprises two like fast silicon P-N photodiode elements in an RFI radiation shield 87 similar to the shield 81 used for the light-emitting diode 15. The output signal from the diode structure 23 develops across resistor 89 and the integrated circuit operational amplifier circuit 91 shown in FIG. 1, has a gain of 100 set by resistors 93 and 95. Resistor 97, puts transistor 99 in saturation by providing an output DC offset. Capacitors 101 and 103 and resistor 105 provide external compensation for amplifier 91. Receipt of a pulse-width-modulated light input signal by diode 23 causes a negative signal to appear at the noninverting input of the amplifier 91, bringing transistor 99 out of saturation and into cutoff.

The means providing pulse-width-to-amplitude conversion, in accordance with the embodiment of this invention shown in FIG. 1 comprises a pulse-width-to-analog converter 25, which has a sample and hold means 107 and buffer amplifier 109, all of which are located in a high-voltage deck 27 forming a high-voltage potential gradient across gap 21 between emitting diode 15 in optical transmitter 111 and detecting diode 23 in optical receiver 113.

Optical receiver 113 applies its pulse-width-modulated output, which corresponds to the input at input terminal 13, to the base 115 of transistor 117 in converter 25. The signal developed across the emitter resistance 119 causes transistor 121 to reset timing capacitor 123 to zero, resistors 125 and 127 and capacitor 129 providing offset correction. The collector current of transistor 117 holds constant due to the clamping of Zener diode 131 at the base of transistor 117. This causes transistor 133 to function as a constant current source for the duration that transistor 117 conducts. Capacitor 123 charges linearly during this time and ceases at the trailing edge of the pulse from optical receiver 113. Thus capacitor 123 runs up in voltage in the same manner as the runup capacitor 43 in the analog-to-pulse-width converter 11. Also, the signal produced by converter 25 resets to zero, linearly increases to a level proportional to the light pulse width of the light-pulse-moderated signal sent by diode 15 and received by diode 23, and holds at that value.

Since it is advantageous not to have the output from pulse-width-to-analog converter 25 reset to zero on each pulse, sample and hold circuit 107 maintains the level of this output pulse from converter 25. To this end transistor 135 gates the comparator 137 formed by transistors 139 and 141 to be inoperative when transistor 117 conducts, i.e. whenever capacitors 123 and 43 run up. After this period, either transistor 139 or 141 conducts, depending on whether the new level of runup capacitor 123 changes to value above or below its previous level. When the level increases, transistor 19 conducts to turn on transistor 143, which charges the "hold" capacitor 145 to the new increased level. If the level decreases to a value less than the previous level, transistor 141 conducts, to turn on transistors 147 and 149, and to shunt the "hold" capacitor 145 until it reaches the desired new level.

The sample and hold circuit 107 applies its output to buffer amplifier 109 comprising transistors 151, 153 and 155, whose input impedance causes capacitor 145 to discharge with a time constant of several milliseconds, while driving a load of 1 kΩ. Only 25 μsec. occurs between pulses to leave little droop.

Figure 3:
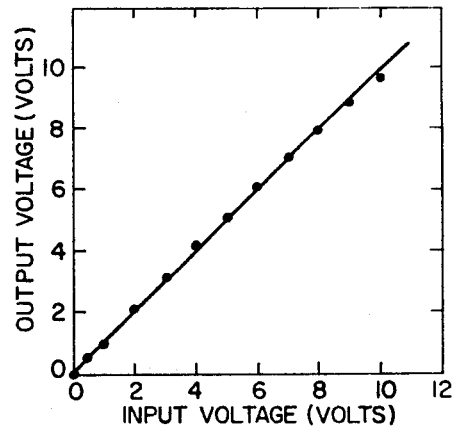
FIG. 3 is a graphic illustration of the DC transfer characteristics of the optical data transmission system of FIG. 1.

FIG. 3 which shows a graph of input vs. output voltage for DC inputs at terminal 13 for testing the linearity of the described circuits indicates only a very small RMS deviation from a 45° line. The slope of the line in FIG. 3 shifts by changing the value of the timing capacitor, allowing tuning of the circuit parameters.

Figure 4:
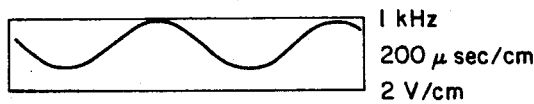
FIG. 4 is a graphic illustration comparing the responses of the apparatus of FIG. 1 to sine wave inputs.
Figure 4:
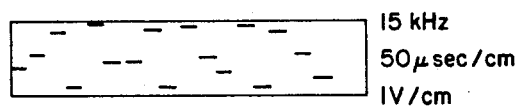

FIG. 4 shows the results of the frequency response of the system of FIG. 1 by applying a sine wave biased at +5 v. to the input terminal 13 of the amplitude-to-pulse-width converter 11.

The system gain as a function of frequency was also tested. In this regard, the response to sinusoidal inputs from 100 Hz. to 15 kHz. indicate that the system of FIG. 1 has a power gain of −3 db. at 10 kHz. Also, the response of the system to a step input is only delayed by the short time required to convert the input level to pulse width and back again.

In operation, the analog amplitude modulation applied to input terminal 13 provides for manual or automatic control, adjustment and monitoring. To this end, switch 157 closes and switch 159 opens to connect a 0 to 10 v. reference control voltage source to input 13, as illustrated in FIG. 2. By adjusting potentiometer 161, the voltage level at input 13 causes the output signal from buffer amplifier 109 to increase, decrease or remain the same.

Closing switch 159 and opening switch 157 provides automatic monitoring and control of precision-regulated power supply 163 for modulator 165 for linac 167. In this regard, the output signal from buffer amplifier 109 biases charge control tube 169 to transmit a desired charge from source 171 to capacitor bank 171. This capacitor bank 171 thus energizes modulator 165 with the desired energy for causing amplifier 175 to energize linac 167 with the desired radiofrequency signal for accelerating charged particles therein. One such linac, amplifier, modulator and capacitor bank are described in U.S. Pat. No. 3,343,096, and shown in FIG. 3 thereof.

By monitoring the sample voltage at the start of recharge of capacitor bank 171, the desired control of charge control tube 169 in deck 27 can be achieved. To this end lead 177 transfers this sample voltage through amplifier 179, which has a clock 181 for providing the desired time and a source 183 for providing a reference signal whereby amplifier 179 provides the desired error signal. This error signal thus provides the necessary analog amplitude modulation signal to optical transmitter 111 for reducing the error signal to zero for maintaining the desired RF input to linac 167

In review of the above, the electrical linkage apparatus 185 of this invention is particularly adapted to controlling a high-voltage valve means, such as a charge control tube 169 in a high-voltage deck 27 for energizing a capacitor bank 171 from a power source 163 for energizing and controlling a modulator 165 and linac 167. This apparatus 185, comprises a low-voltage optical transmitter means 111 having a modulated light source 15 and light pipe 17 for producing and transmitting pulse-width-modulated command signals across a high-voltage potential gradient gap 21, and optical receiver means 113 responsive to said command signals for controlling said valve means, such as said charge control tube 169 for transmitting energy from said source 163 for charging and recharging said capacitor bank 171 for energizing said modulator 165 for producing RF signals corresponding to the pulse width of said command signals from said light source 15 for energizing and controlling said linac 167. As described, the input to the light source 15, can be manually adjustable means 189, comprising source 190 and pot 161, or automatic adjustable monitoring and modulating control means 191, comprising feedback line 177 from capacitor bank 171, amplifier 179, clock 181, and reference source 183 for producing an error signal modulator input for input terminal 13 of optical transmitter 111 for adjusting the output of optical receiver 113 for reducing the error signal to zero. To this end, in one embodiment the optical transmitter comprises an analog to pulse width convertor 11 and multivibrator 32 for receiving the described input at input terminal 13 and light source 15 and transmitting the input information to the optical receiver, which comprises a pulse-width-to-analog converter 25, sample and hold means 107, and buffer amplifier 109 for transmitting the information in the input to input terminal 13 for controlling the value such as charge control tube 169. Thus the apparatus 185 of this invention makes possible the multiturn injection and acceleration of particles and the production and use of separate beams from the accelerator 167 for separate targeting or further acceleration. To this end, the apparatus of this invention transmits information in either direction across gap 21 for transmitting information in either direction selectively corresponding to amplitude, pulse duration, reference level and voltage, bias and/or current for controlling and/or monitoring deck 27 or linac 167.

While the above-described system operates to control and monitor information in opposite directions across the high-voltage gradient gap 21, it is understood that the direction of either or both functions can be reversed. To this end, for example, the optical receiver and transmitter can simply be reversed or suitably located as desired.

The described system has the advantage of providing a simple, accurate, practical and efficient system for transmitting information across a high-voltage gradient for controlling and/or monitoring high-voltage equipment. Moreover, the system of this invention operates in areas of high levels of RF and/or ionizing radiation, and transmits and/or responds to information in both directions across the high-voltage gradient.

What I claim is:

1. Valve means for controlling electrical energy for energizing and controlling a high-energy capacitor bank that energizes a modulator and a high-energy linear accelerator seriatim, comprising:
    a. low-voltage means at a first location having a high frequency, infrared, pulse-width-modulated source including a light pipe for producing and transmitting pulse-width-modulated command signals at high frequency to a second location across a high-voltage, potential difference gradient, insulating gap, the pulse width duration of said command signals containing control information; and
    b. means responsive to said command signals and being connected to said valve means at said second location for effecting the transmission of said electrical energy to said capacitor bank in accordance with the pulse widths of said command signals for energizing said modulator to produce radiofrequency signals corresponding to the pulse-width duration of said command signals whereby said high-energy linear accelerator is energized and controlled across said gap in accordance with said control information.

2. The invention of claim 1 having means for manually controlling the pulse-width modulation of said infrared source for controlling the pulse width of said command signals for the controlled transmission of information by said command signals.

3. The invention of claim 1 having current level computer means for controlling the pulse-width modulation of said infrared source for controlling the pulse width of said command signals for the controlled transmission of information by said command signals.

4. The invention of claim 3 in which said current level computer means is responsive to the voltage at the start of said recharge of said capacitor bank and a desired voltage and time for producing an error signal for controlling said low-voltage means for adjusting the pulse width of said command signals to a desired level for reducing said error signal to zero thereby to control the information transmitted by said command signals.

5. The invention of claim 1 in which said low-voltage means has an analog-to-pulse-width converter responsive to analog input signals for controlling the pulse width of said command signals to a desired level corresponding to predetermined analog amplitude input levels.

6. The invention of claim 1 in which said means responsive to said command signals has a pulse-width-to-analog amplitude converter for producing analog amplitude output signals for controlling said valve means for controlling the amplitude of said charging and recharging of said capacitor bank from said electrical energy source through said valve means.

7. The invention of claim 1 in which said high frequency, infrared, incoherent, pulse-width-modulated source is responsive to analog amplitude input information for producing light pulses whose pulse width corresponds to said analog amplitude input information for transmission by said light pipe and receipt by said means responsive to said command signals for conversion thereby into analog output signals corresponding to the analog amplitude of said input information for controlling said valve means for transmitting energy from said electrical energy source for said charging and recharging of said capacitor bank an amount corresponding to the amplitude of said analog input information.

8. The invention of claim 1 in which said infrared source, comprises a light-emitting diode having an analog-pulse-width converter for producing a light pulse output whose pulse width corresponds to analog amplitude input information signals transmitted to and received by said analog-to-pulse-width converter for the efficient transmission of said light pulses by said light pipe substantially independently of the variation in input amplitude to pulse power amplitude output characteristic of said diodes, and said means responsive to said command signals, comprises photodiode detectors having a pulse-width-to-analog amplitude converter, sample and hold means, and a buffer amplifier, for efficiently producing and transmitting bias signals for controlling the output of said valve means, which comprises a charge control tube, for accurately transmitting energy from said electrical energy to said capacitor bank corresponding to said analog amplitude input information for selectively maintaining and varying the RF input to said linear accelerator.

9. The invention of claim 1 in which said low-voltage means has input means for said infrared source means for monitoring and transmitting information in either direction across said high-voltage gradient interface selectively corresponding to amplitude, pulse duration, reference level and voltage, bias and current, for selectively controlling and monitoring the same.